United States Patent [19]

Gail

[11] 4,126,984
[45] Nov. 28, 1978

[54] APPARATUS FOR THE AUTOMATIC LATERAL GUIDANCE OF AGRICULTURAL MACHINES

[75] Inventor: Josef Gail, Unterwittelsbach, Germany

[73] Assignee: Maschinenfabrik Fahr AG Gottmadingen, Gottmadingen, Germany

[21] Appl. No.: 748,220

[22] Filed: Dec. 7, 1976

[30] Foreign Application Priority Data

Dec. 9, 1975 [DE] Fed. Rep. of Germany ....... 2555283

[51] Int. Cl.² .......................................... A01D 75/28
[52] U.S. Cl. ............................. 56/10.2; 56/DIG. 15
[58] Field of Search ........... 56/10.2, 121.41, DIG. 15; 47/1.7; 172/5, 6, 38, 233, 234

[56] References Cited

U.S. PATENT DOCUMENTS

| | | | |
|---|---|---|---|
| 2,433,856 | 1/1948 | Marihart | 56/DIG. 15 |
| 2,610,562 | 9/1952 | Ward | 172/5 |
| 2,749,824 | 6/1956 | Friday | 172/5 |
| 2,929,457 | 3/1960 | Langerak | 56/DIG. 15 |
| 2,981,355 | 4/1961 | Rabuse | 172/5 |
| 3,066,469 | 12/1962 | Chatagnier | 56/DIG. 15 |
| 3,177,950 | 4/1965 | Laikam | 172/5 |
| 3,196,599 | 7/1965 | Meiners et al. | 56/10.2 |
| 3,369,612 | 2/1968 | Laikam | 172/5 |
| 3,797,208 | 3/1974 | Strubbe | 56/10.2 |
| 3,903,969 | 9/1975 | Bellussi | 172/5 |
| 3,913,681 | 10/1975 | Lincoln et al. | 172/5 |
| 3,946,825 | 3/1976 | Gail | 56/10.2 |
| 3,972,381 | 8/1976 | Gail | 56/10.2 |
| 3,991,618 | 11/1976 | Stampfer et al. | 56/DIG. 15 |

FOREIGN PATENT DOCUMENTS

| | | | |
|---|---|---|---|
| 575,714 | 12/1923 | France | 172/233 |
| 594,838 | 7/1925 | France | 172/234 |
| 1,289,901 | 5/1961 | France | 172/233 |

Primary Examiner—Louis G. Mancene
Assistant Examiner—Paul J. Hirsch
Attorney, Agent, or Firm—Karl F. Ross

[57] ABSTRACT

A system for the lateral guidance of agricultural machines, especially harvesting machines to be guided along a line determined by a crop row or a stand of crop along a previously cut swath, has a deflectible sensor for feeling the position of the crop along the guide line and means for automatically steering the vehicle to maintain the latter along a predetermined path established by this line. The improvement of the invention comprises a deflector fixed rearwardly of the sensor to prevent excessive displacement thereof by individual stalks which may be out-of-place and thereby preclude an excessive response of the automatic steering system because of occasional out-of-place stalks.

6 Claims, 3 Drawing Figures

APPARATUS FOR THE AUTOMATIC LATERAL GUIDANCE OF AGRICULTURAL MACHINES

FIELD OF THE INVENTION

The present invention relates to an improvement in the automatic lateral guidance or steering of an agricultural machine, especially a harvester, which is designed to move along a guideline determined by a standing crop, usually a stalk or row crop, and particularly to a device for preventing excessive response of an automatic steering or lateral guidance system when out-of-place stalks are encountered.

BACKGROUND OF THE INVENTION

It is known to provide agricultural machines, especially harvesting threshers, mowers, field harvesters and field choppers, as well as row-crop harvesting machines with automatic guidance systems for enabling the machine to follow a predetermined path along a guideline which can either be a stand of uncut crop or a row of crop material among the swath to be harvested.

Crop rows are seldom perfectly straight and, or course, have configurations which depend upon the paths of the plow, the seeding machine and other apparatus which has been used before emergence of the crop. In contour farming, for example, the rows of crop are hardly ever straight and may even have intricate patterns. Prior to the advent of automatic devices for properly positioning the harvesting head of the machine to follow the contours of the row, the operator of the machine was occupied full time in steering the apparatus along the desired harvesting line.

With the development of lateral guidance systems, i.e. automatic steering controls for harvesting machines, the operator can be concerned less with guiding the machine along the proper path and more with the effective functioning of the increasingly complicated apparatus. These controls generally comprise a device, e.g. a hydraulic cylinder, coupled to the steering mechanism of the vehicle, a sensor for following the row of crop to be cut or a stand of crop material alongside a previously cut swath, and means responsive to the sensor for operating the automatic steering control to maintain the vehicle in a proper path along this line.

Thus, the automatic steering of agricultural machines along a predetermined guideline, for example, a stand of crop or a row of stalks, is known in the art. The sensing device produces a signal which can be applied to a controller, e.g. a comparator, so that the output signal of the latter is applied to a hydraulic cylinder or other positioning element (e.g. a servomechanism), thereby correcting the position of the automatic steering device to follow deviations of the guideline from a previous orientation.

One of the problems with such systems, especially when the sensing element is an arm or finger which is deflected by the crop material along the guideline, is that this sensing element frequently encounters individual stalks which are out-of-place, i.e. stalks which are bent over, which may have grown out of the row, or which are pieces partially broken from a stalk properly growing in the row sensed by the arm or finger.

Since such out-of-place stalks are frequently stable, they deflect the sensing arm and cause an undesired correction response of the apparatus, especially where the out-of-place stalk is at some distance from the line to be sensed. As a result of the undesired or excessive corrections in the direction of movement of the machine, crop material may be uncut or the swath being cut may be given an undesired contour which can make inconvenient the cutting of adjacent swaths or rows.

Another disadvantage of conventional devices is that, when the sensor is positioned on the head of the harvesting machine, it is frequently soiled and rendered inoperative in conventional systems.

OBJECTS OF THE INVENTION

It is the principal object of the present invention to provide an automatic steering or lateral guide control for agricultural machines of the aforedescribed type, especially harvesting machines, whereby the aforementioned disadvantages are obviated.

Another object of the invention is to provide an automatic control system for this purpose which does not respond to undesirable perturbations, such as individual out-of-place stalks, to an excessive degree, which is less susceptible to contamination and breakdown and which, in general, provides a more stable control of the machine than has heretofore been the case in a simple and economical manner.

It is another object of the invention to provide a sensor for a control system of the character described which is less susceptible to contamination and provides a more stable operation than earlier sensors used for similar purposes.

SUMMARY OF THE INVENTION

These objects and others which will be apparent hereinafter are attained, in accordance with the present invention, in an automatic lateral guide system (steering control) for agricultural machines or vehicles, especially harvesting threshers, selfguiding choppers, corn pickers and the like, adapted to be propelled along a predetermined guideline and having the front of the machine, e.g. the crop-guiding or cutting head, a sensor for the guideline in the form of a deflectable (angularly displaceable) arm.

According to the invention, behind this arm, with respect to the direction of displacement of the machine, there is provided a fixed deflector which is shorter than the arm and mounted on the support thereof to terminate short of the free end of this arm. The deflector serves to limit the angular displacement of the arm rearwardly when the arm encounters significantly out-of-place stalks and supports the arm against further angular displacement, while deflecting the out-of-place stalk toward the guideline. Alternatively, the deflector can be positioned in different vertical plane from the swingable arm to deflect the out-of-place stalk without supporting the arm, this deflection of the stalk preventing further swinging movement of the arm.

According to a feature of the invention, the sensing arm is mounted on a post at the leading edge of the harvesting head so that it is positioned above the crop-engaging portions of the head, i.e. above the sickle bar or crop-cutting tools thereof.

Advantageously, the arm is a rearwardly bent member and may have a straight portion swingably mounted on the post and a rearwardly turned arcuately bent extremity disposed outwardly of the end of the deflector.

The elevated position of the sensor prevents contamination, soiling and disruption of its operation.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
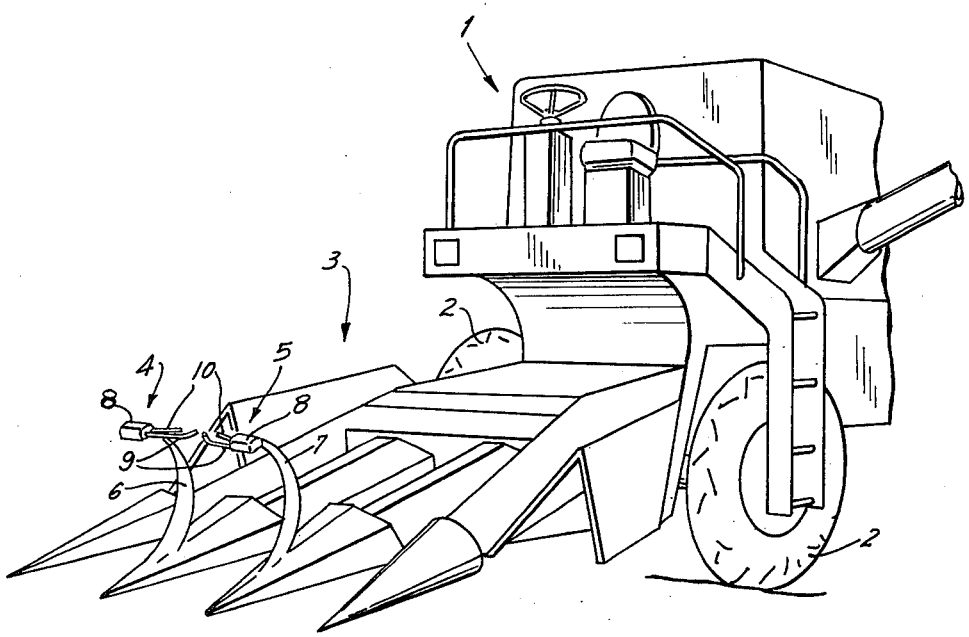
FIG. 1 is a diagrammatic perspective view of a corn-picking machine according to the invention.
Figure 3:
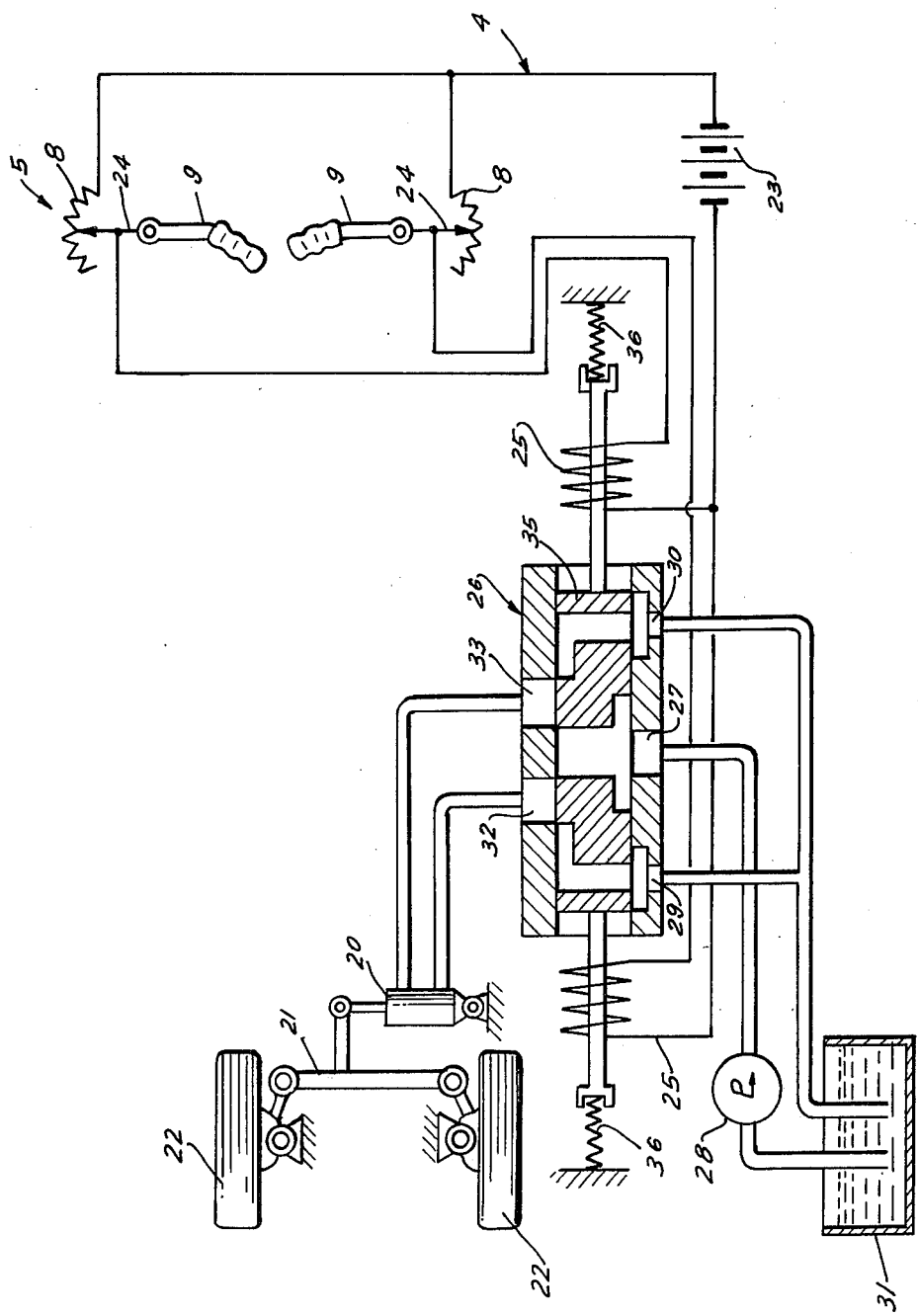
FIG. 3 is a diagram of a system embodying the sensor of this invention.

The harvester 1 shown in FIG. 1 can be provided with any conventional automatic steering device whose individual components have not been shown but are well known in the art and may be the components represented in FIG. 3. Such systems as respond to a swingable arm sensor are, as indicated, well known in agricultural practice and any of them can be employed for the present purposes.

At the front of the harvester 1, which is of the self-propelled type and has steerable rear wheels not shown, there is provided a pair of nonsteerably front wheels 2 and, ahead of these wheels, a corn-picking head 3.

The input to the automatic steering control is constituted by a pair of sensing units 4 and 5 which produce electrical signals designed to operate the automatic steering control. The sensing devices 4 and 5 are each mounted on a post 6, 7 extending upwardly from two intermediate shoes of the corn-picking head which is of the three-row type with four such shoes defining three channels for respective rows of corn between them. The sensing devices 4 and 5 respond to the position of the central crop row of the three rows to be harvested, this central row defining the guideline for the machine.

Each of the sensing devices 4 and 5 can comprise a potentiometer 8 whose moving element is connected to a sensing arm 9 which has a straight portion reaching away from the post and terminating in a rearwardly bent-free extremity. Each post also carries a deflector 10 reaching toward the row of crop 11 but inclined rearwardly to allow some deflection of the arm 9 but limiting this deflection upon engagement of the arm 9 by an out-of-place stalk 13 as will be described in greater detail below.

Figure 2:
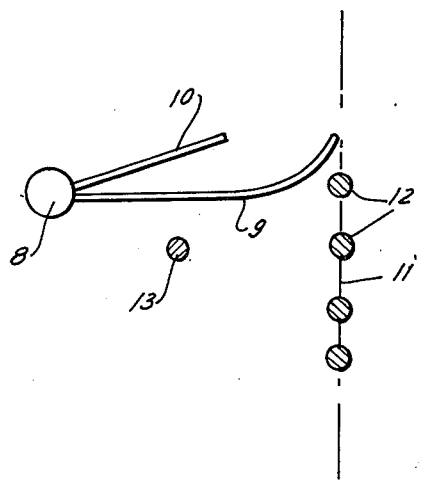
FIG. 2 is a plan view of the sensor and deflector assembly according to the invention, although in diagrammatic form.

The deflector 10, which can be an arm in the same plane as the arm 9, has a length less than that of the arm 9 so that it terminates short of the curved end portion thereof (FIG. 2).

In FIG. 2, moreover, the guideline is represented in dot-dash at 11 and comprises the individual corn stalks 12.

The automatic steering arrangement operates completely normally as long as there are no deviations from the guideline 11. Thus, the sensor 4 or 5 responds to deviations to either side of the path corresponding to line 11 to realign the vehicle with this path and, even if the rows bent or turned to some extent, there is a continued following of the guideline.

When, however, individual plant stalks are bent out of the row 11 or are otherwise out-of-place, they are engaged by the arm 9 and, if not for the presence of the deflector 10, would produce an overcorrection in the movement of the harvester. The deflector 10, however, prevents excessive displacement of the arm by urging the stalk 13 back toward the row 11 as the vehicle advances.

Unnecessary corrections are thereby avoided without interfering with the ability of the control system to follow ordinary deviations of the row itself from the rectilinear. The stability of steering and control is thereby markedly increased at relatively low cost. The posts 6 and 7 have, in horizontal cross-section V-profiles with their vertices turned forwardly so that they, too, deflect fallen stalks away from the sensor.

In FIG. 3, I have shown diagrammatically a system which can be used to control the vehicle, this system comprising a double-acting cylinder 20 which acts upon the steering linkage 21 of the steerable rear wheels 22 of the vehicle 1. The potentiometers 8, of the sensors 4 and 5 are connected to one side of an electrical supply source 23, such as the vehicle battery, while the deflectable arms 9 are connected to respective wipers 24 of the potentiometers. Each of these wipers 24 is connected to one side of a coil 25 acting upon a control valve 26 whose input port 27 is supplied with hydraulic medium from the pump 28 of the machine. Ports 29 and 30 of the valve are connected to the reservoir 31 while ports 32 and 33 are tied to opposite sides of the cylinder 20. The valve body 35 is centered by springs 36. Thus, when the deflectable arm 9 of sensor 4 is rotated in a counterclockwise sense representing the need for a suitable correction of the path of the vehicle, the electrical signal is applied to the corresponding coil 25 of the valve 26 to feed fluid to the cylinder 20 and turn the wheels 22 in the proper direction. The other sensing device operates similarly. Of course, more complex control circuits can be used if desired.

I claim:

1. In an automatic lateral guide system for an agricultural machine wherein a sensor responds to standing crop material at the cutting head of the machine to control the path thereof and cause the machine to travel along a guideline formed by the crop material, the improvement wherein:

said sensor comprises a swingable arm mounted at one end on said head and having a free extremity engageable with said crop material;

a potentiometer connected to said arm to control a magnetic valve controlling the steering of the machine;

an elongated crop deflector fixed on said head substantially at the level of said arm and having a free end terminating short of the free end of said arm rearwardly thereof;

said arm and said deflector being disposed on a common support and reach away therefrom in generally the same direction; and said deflector is disposed behind said arm in an undeflected rest position thereof relative to the direction of travel of said machine and includes an acute angle with said arm in said rest position thereof, the arm being deflectable without interference by said deflector by stalks along said line, said deflector preventing full deflection of said arm by plant parts out of said line by urging the plant parts toward the line.

2. The improvement defined in claim 1 wherein said arm and said deflector are mounted above said head.

3. The improvement defined in claim 1 wherein said extremity of said arm is bent rearwardly with respect to the direction of travel of the machine.

4. The improvement defined in claim 1, further comprising a post mounted at a forward end of said head, said sensor being disposed on the top of said post, said sensor comprising a potentiometer actuatable by said arm upon angular displacement thereof, said deflector limiting the angular displacement of said arm, said arm having a straight portion extending from said post and a rearwardly bent portion constituting said extremity of said arm, the length of said deflector corresponding to the length of said straight portion.

5. The improvement defined in claim 4 wherein said post has a V-profile in horizontal cross-section with the vertex of the V turned forwardly.

6. The improvement defined in claim 5 wherein said head is a corn-picking head for a plurality of rows and has crop-guiding shoes adapted to pass between said rows, said post being mounted on one of said shoes.

* * * * *